D. R. COLLIER.
COMBINED SCHOOL DESK AND SEAT.
APPLICATION FILED MAR. 18, 1919.

1,389,185.

Patented Aug. 30, 1921.
3 SHEETS—SHEET 1.

Inventor
David R. Collier
By Wright Brown Quinby May
Attorneys

D. R. COLLIER.
COMBINED SCHOOL DESK AND SEAT.
APPLICATION FILED MAR. 18, 1919.
1,389,185.
Patented Aug. 30, 1921.
3 SHEETS—SHEET 2.
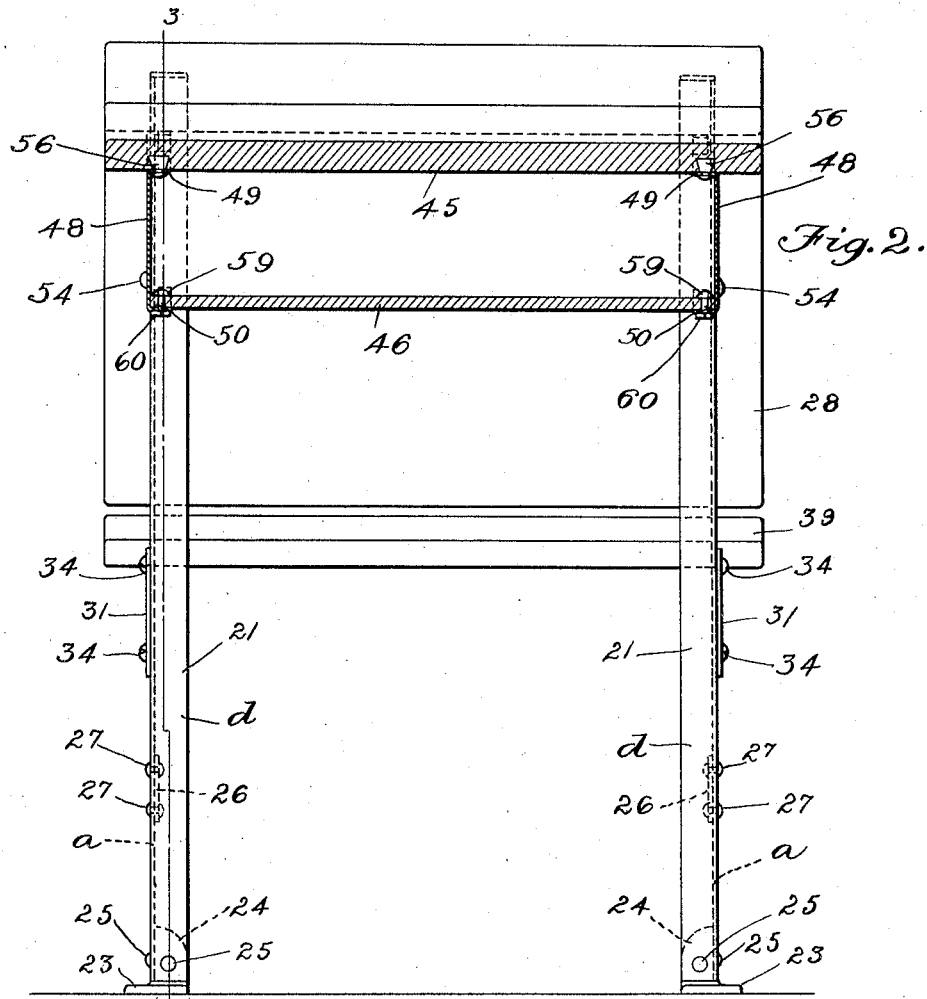
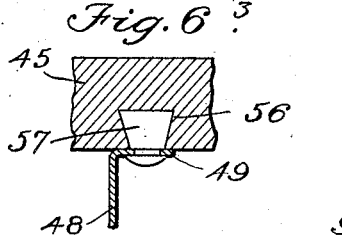
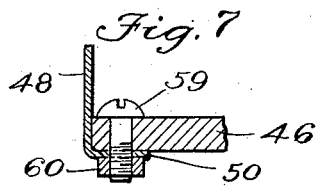
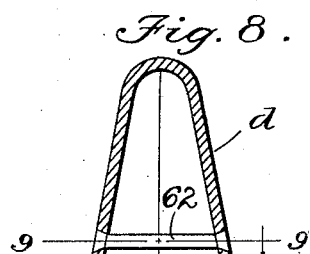
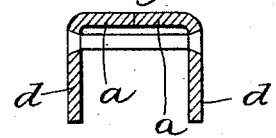
Inventor
David R. Collier
by Wright Brown Quimby May
Attorneys

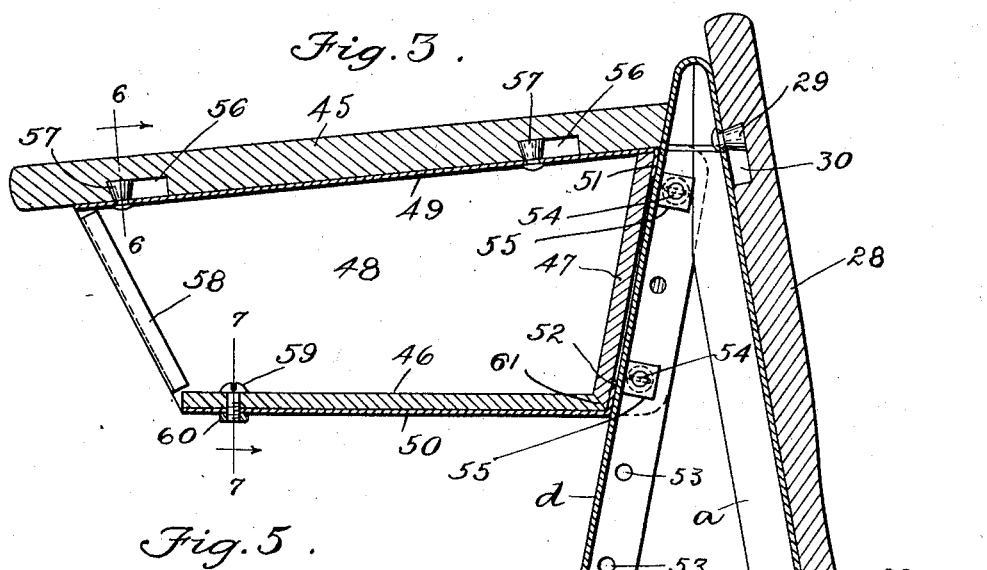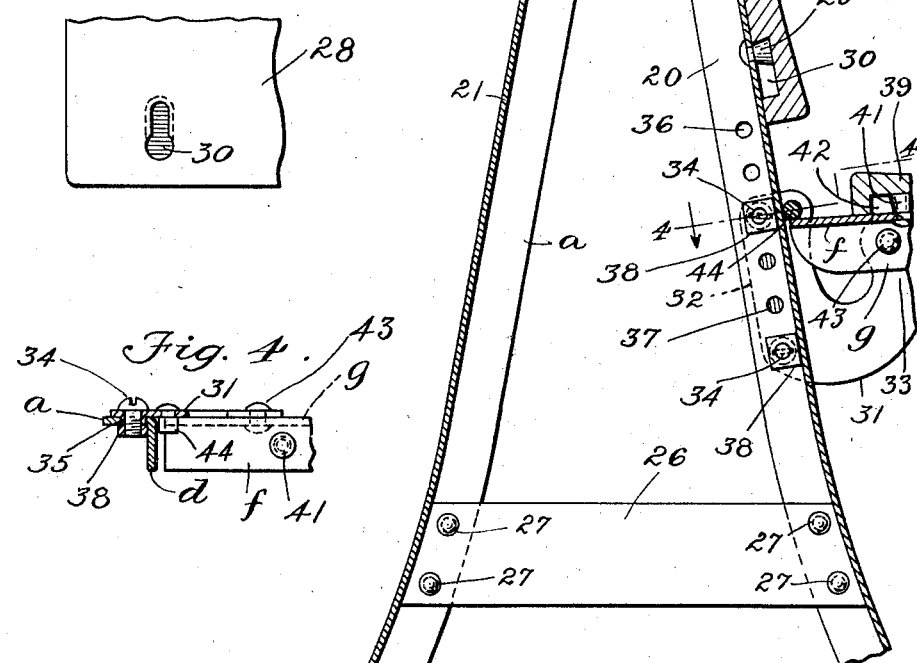

UNITED STATES PATENT OFFICE.

DAVID R. COLLIER, OF GARDNER, MASSACHUSETTS, ASSIGNOR TO COLLIER-KEYWORTH COMPANY, OF GARDNER, MASSACHUSETTS, A CORPORATION OF MASSACHUSETTS.

COMBINED SCHOOL DESK AND SEAT.

1,389,185.  Specification of Letters Patent.  Patented Aug. 30, 1921.

Application filed March 18, 1919. Serial No. 283,360.

*To all whom it may concern:*

Be it known that I, DAVID R. COLLIER, a citizen of the United States, residing at Gardner, in the county of Worcester and State of Massachusetts, have invented new and useful Improvements in Combined School Desks and Seats, of which the following is a specification.

This invention has relation to school furniture and more particularly to combined desks and seats. It has for its object to provide light inexpensive and yet strong, rigid and durable construction, to afford improved means for adjusting the desk and the seat to accommodate pupils of various sizes, to improve and simplify the means for pivotally supporting the seat, and to secure certain other desirable improvements.

On the accompanying drawings,—

Fig. 2 represents a rear elevation, partially in section, on the line 2—2 of Fig. 1.

Fig. 3 represents a vertical longitudinal section of the same.

Fig. 4 represents a section on the line 4—4 of Fig. 3.

Fig. 5 illustrates one of the key-hole slots formed either in the desk top or in the seat back.

Fig. 6 represents a section on the line 6—6 of Fig. 3.

Fig. 7 represents a section on the line 7—7 of Fig. 3.

Fig. 8 represents in section the upper end of one of the side standards.

Fig. 9 represents a section on the line 9—9 of Fig. 8.

Figure 1:
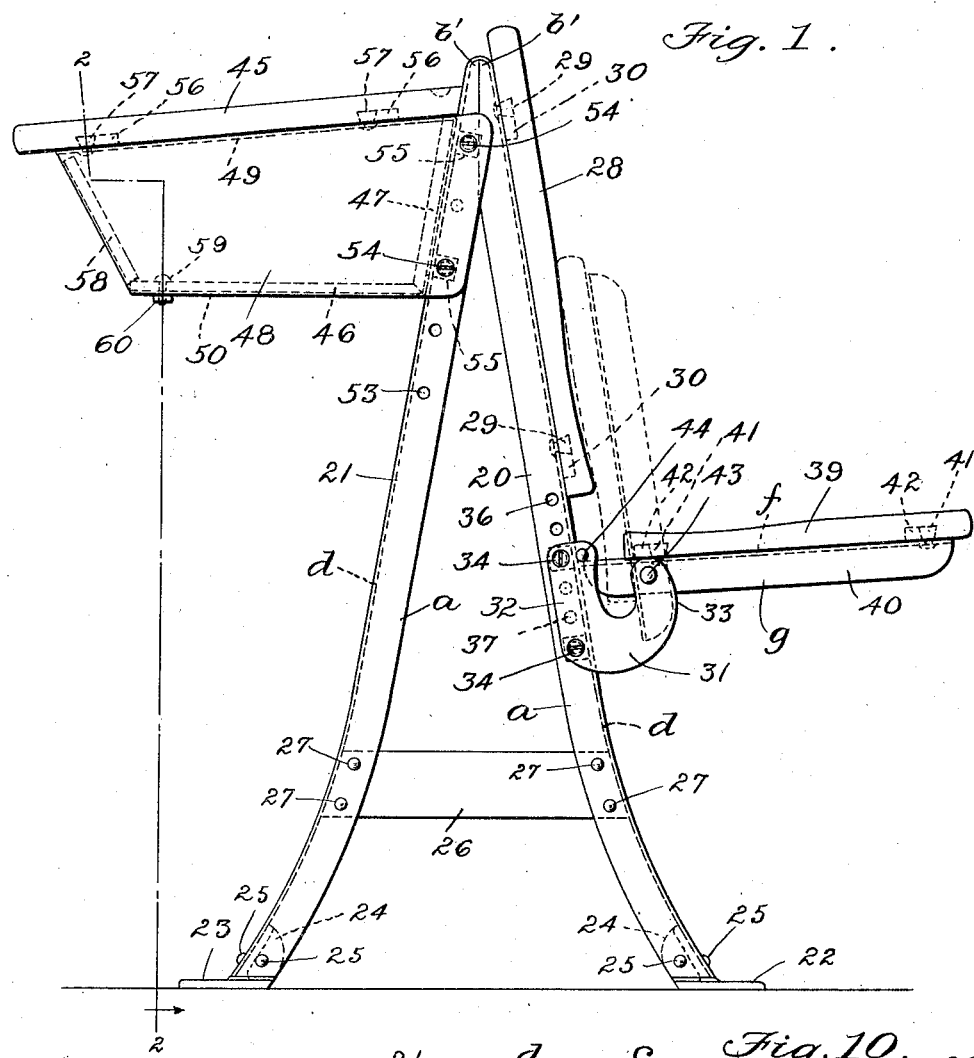
Figure 1 shows in side elevation a structure embodying the invention.
Figure 10:
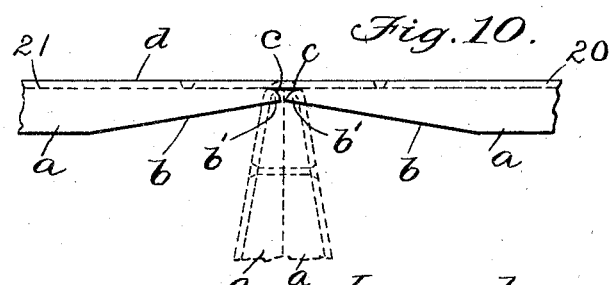
Fig. 10 represents the angle blank and illustrates the mode of bending it.
Figure 11:
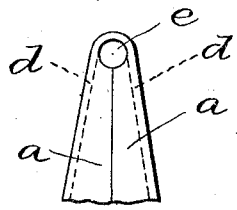
Fig. 11 illustrates the upper end of an end standard slightly different in construction.

The frame of the structure consists of two side standards, each of which preferably consists of an angle bar bent upon itself to provide two upwardly converging legs connected at their upper ends and substantially of inverted V-shape. Thus each side standard consists of a front leg 20 and a rear leg 21 which are arranged at an acute angle. Near their lower ends, the legs may be divergently curved and provided with feet 22, 23 which may be screwed to the floor. As shown, these feet may be of cast metal and are provided with upwardly extending angular flanges 24 to fit within the angle of the angle bars and which are secured thereto by rivets 25. In order that the angle bars may be bent upon themselves, the flanges *a a* are cut to provide the edges *b b* as shown in Fig. 10, so that, when the web *d* is bent, these edges will meet. Tongues *b'* are formed by making the cuts indicated at *c c*, and, when the web *b* is bent, these tongues extend into the semicircle and fill the same as shown in Fig. 1. The upper ends of the legs are thus connected by the uncut portion of the web *d*, and the upper ends of the standards are therefore blunt. The flange *a*, however, may, instead of being formed with the tongues *d*, be cut away as shown in Fig. 11 so as to leave the circular aperture *e*.

The two standards are arranged so that the webs *d* thereof extend toward each other and with the flanges *a* at the outer faces thereof. It is quite evident, however, that, instead of using angle bars, channel bars might be substituted therefor.

Near their lower ends, the two legs of each side standard are connected by a cross bar 26 formed of a relatively thin metal plate which is secured to the flanges *a a* by rivets 27. The ends of the plate 26 are placed against the inner faces of the flanges *a a*. By virtue of this construction, each side frame resembles in appearance the capital letter A. The seat and the back therefor are supported upon the front legs of the standards, while the desk is supported by the rear legs thereof. The back, which is indicated at 28, is preferably formed of wood and its ends extend a short distance beyond the side standards, as shown in Fig. 2. The webs *d* of the front legs are provided with undercut rivet studs 29, and the back 28 is provided with key-hole slots 30, such as shown in Fig. 5. For the purpose of attaching the movable seat to the front legs, I employ two brackets 31, each of which is substantially U-shape with one arm a little shorter than the other. That is each bracket is provided with a body portion 32 and with a forwardly and upwardly extending arm 33. Each bracket is stamped out of sheet metal and the body portion thereof is formed with two holes, through which bolts 34 may be passed into apertures formed in the flange $a$ of the front leg. Preferably the metal forming the wall of each hole is drawn into the shape of an annular flange 35, as shown in Fig. 4, so that it may extend into the aperture in the flange $a$. In order that the seat brackets may be adjusted vertically for pupils of different heights, each of the front legs is provided with two series of spaced apertures indicated at 36, 37, there being in the present instance three apertures in each series with which the annular flanges on the seat bracket may be engaged. On the inner ends of the bolts 34, are the nuts 38 which are held against rotation by their engagement with the webs $d$ of the legs. The seat 39, which is preferably made of wood, is detachably engaged with two seat end bars 40. Each of the members 40 may conveniently be made of angle iron, with a web $f$ and a flange $g$. The webs $f$ are provided with undercut rivet studs 41 for engagement with key-hole slots 42 formed in the under face of the seat 39. The flanges $g$ of the end bars 40 are apertured to receive rivets 43 which extend into the extremities of the arms 33 of the bracket. The fit of the rivets in their apertures is such as to permit of a pivotal movement of the seat, so that it may be swung from the full-line position in Fig. 1 to the dotted-line position. The rear ends of the bars 40 project rearwardly beyond the seat, so that, when the latter is in its proper position to receive a pupil, said ends may be engaged with studs 44 riveted to the brackets 31 and extending inwardly therefrom. Since each of the brackets is substantially U-shaped, when the seat is folded upwardly, the rear edge of the seat may extend into the space between the two arms of the bracket, as shown by dotted lines in Fig. 1.

The desk consists of a box, which is open at its rear end and which comprises the top 45, the bottom 46, and the front end wall 47, all of which may be made of wood, and the two ends 48. Each of the desk ends is made of thin sheet metal, provided at its upper and lower marginal portions with the inwardly projecting flanges 49, 50, respectively. At its front end, the flange 49 is provided with the downwardly bent lip 51, and the flange 50 is provided with a similar upwardly projecting lip 52. The front portions of the desk ends are arranged to embrace the flanges $a$ of the rear legs, and may be secured thereto by bolts. The flanges $a$ are provided with a series of holes or apertures 53, and the walls of the bolt apertures in the desk ends are provided with annular flanges identical with those at 35 in Fig. 4, so that these flanges may extend into the apertures in the web. Bolts 54 are passed through the end plates 48 and through the apertures 53, and are screwed into the nuts 55 which are held against rotation by their engagement with the webs $d$ of the rear legs. By providing the plurality of spaced apertures 53, the desk may be vertically adjusted to suit the height of the pupil. The desk top 45 is provided with key-hole slots 56 to receive the undercut rivet studs 57 which are riveted to the flanges 49, as best shown in Fig. 6. At their rear ends, the end plates are provided with inwardly bent flanges 58 to prevent the formation of raw edges which might cut the hands of pupils in attempting to place articles in or remove them from the box. The front wall 47 of the box is, as has been stated, made of wood, and its front face bears against the lips 51, 52, which in turn bear against the web $d$ of the rear legs 21. The bottom 46 rests upon the flanges 50, and may be secured in place by bolts 59 and nuts 60, said bolts passing through apertures in the bottom 46 and in the flanges 50. The front edge of the bottom 50 and the lower edge of the front wall 47 are beveled to form a miter joint as indicated at 61. The top 45 and the bottom 46 of the desk converge rearwardly, and consequently, after the front wall 47 has been properly located and the bottom 46 is secured in place, the said front wall 47 is securely held against dislocation. That is, the lower edge of the front wall is clamped against the lips 52 by the bottom 46, and the upper edge of the wall 47 is prevented from moving forwardly by the flange 49.

The structure is of knockdown construction. The back, the seat, and the desk, which latter is separated into its components, may be all assembled with the side standards and shipped in a flat package. In assembling the desk, the seat brackets are secured to the front legs of the side standards at a suitable elevation, and the back 28 is secured to the front legs so as to hold them at the proper distance apart. This is done by causing the studs 29 to engage the enlarged portions of the key-hole slots and then forcing the back bodily downwardly until the studs occupy the upper ends of the said slots. The end plates 48 are next secured to the flanges $a$ of the rear legs at the proper height, and the desk top 45 is engaged with the studs 57. Then the front wall 47 is introduced and placed against the ears or lips 51, 52, after which the bottom wall 46 is inserted in place and is secured by the bolts 57 and nuts 60. The engagement of the studs 57 with the desk top 45, and the engagement of the bolts 59 with the bottom 46 and the flange 50, prevent the end plates from spreading and hold them in parallelism.

The seat is now engaged with the lugs 41 on the end bars 40, and the structure is thus completely assembled.

It will be seen that the side standards are of the simplest construction, and, being made of angle bars, are light, strong and rigid, the divergent portions of the legs of the standards being rigidly connected by the cross braces 26. The seat brackets, which are preferably permanently riveted to the seat bars 40, are also light in weight, being as previously stated stamped out of sheet metal. Furthermore the end walls or plates of the desk may be made of thin sheet metal but are sufficiently strong to prevent any yielding of the desk top. The whole structure is thus very simple and inexpensive in construction, and yet strong and durable. The structure is rigid, this being assisted by the divergent curvature of the lower ends of the legs, which may be spread apart as far as desired. By providing the seat brackets 31 with the annular flanges to extend into the apertures formed in the flange $a$ of the front legs, the strain is removed from the bolts 34 and is borne by the metal of the bracket and by the flange $a$.

To prevent any separation of the meeting edges of the flanges $a$ at the upper ends of the side standards, I sometimes employ rivet pins 62 which are passed through the webs $d$ and upset as shown in Fig. 8.

When the structures are arranged in rows in the school room, as ordinarily, the seat, back and seat bracket are omitted from the first structure in each row, and the desk is omitted from the last structure, no different frame work for the "row ends" being required.

Having thus explained the nature of my said invention and described a way of making and using the same, although without attempting to set forth all of the forms in which it may be made or all of the modes of its use, what I claim is:

In a school desk, side standards, sheet-metal end walls each having inturned marginal flanges at its upper and lower edges, said flanges being formed with downwardly and upwardly extending lips, respectively, and the upper flange having top-securing studs, a top resting upon the upper flanges and interlocked with said studs, a bottom resting upon the lower flanges and secured thereto, and a front wall embraced by said lips and held thereagainst by said bottom, said end walls having forwardly extended portions secured to said side standards.

In testimony whereof I have affixed my signature.

DAVID R. COLLIER.